US012341247B2

(12) United States Patent
Chakravarty et al.

(10) Patent No.: US 12,341,247 B2
(45) Date of Patent: Jun. 24, 2025

(54) MULTI-PORT MULTI-FUNCTIONAL META-SURFACE COPLANAR ANTENNA SYSTEM FOR BEAM STEERING CONTROL

(71) Applicant: Tata Consultancy Services Limited, Mumbai (IN)

(72) Inventors: Tapas Chakravarty, Kolkata (IN); Amartya Banerjee, Kolkata (IN); Arpan Pal, Kolkata (IN); Rowdra Ghatak, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 148 days.

(21) Appl. No.: 18/346,545

(22) Filed: Jul. 3, 2023

(65) Prior Publication Data

US 2024/0022003 A1 Jan. 18, 2024

(30) Foreign Application Priority Data

Jul. 14, 2022 (IN) ............................ 202221040497

(51) Int. Cl.
*H01Q 3/24* (2006.01)
*H01Q 15/00* (2006.01)
(Continued)

(52) U.S. Cl.
CPC ........... *H01Q 15/0006* (2013.01); *H01Q 3/24* (2013.01); *H01Q 3/2682* (2013.01); *H01Q 19/30* (2013.01)

(58) Field of Classification Search
CPC ...... H01Q 3/24; H01Q 3/2658; H01Q 3/2682; H01Q 3/38; H01Q 15/0006; H01Q 15/02;
(Continued)

(56) References Cited

U.S. PATENT DOCUMENTS 10,553,947 B2 * 2/2020 Scarborough .......... H01Q 21/22
10,931,004 B2 2/2021 Yoo et al.
2020/0358205 A1 * 11/2020 Sun .......................... H01Q 1/48

OTHER PUBLICATIONS

Dadgarpour et al. "Beam-Deflection Using Gradient Refractive-Index Media for 60-GHz End-Fire Antenna", IEEE Transactions on Antennas and Propagation, IEEE, USA, vol. 63, No. 8, Aug. 1, 2015 (Year: 2015).*

(Continued)

*Primary Examiner* — Daniel Munoz
(74) *Attorney, Agent, or Firm* — Finnegan, Henderson, Farabow, Garrett & Dunner, LLP

(57) ABSTRACT

This disclosure relates generally to multi-port multi-functional meta-surface coplanar antenna system. Conventional electronic or mechanical solutions for beam steering incur high installation costs with less performance speed and bulk structures. The present disclosure provides multi-port multi-functional meta-surface coplanar antenna system for beam steering control. The disclosed antenna system enables radiator to have a performance diversity application through beam steering functionalities. The disclosed antenna system provides a minimal design complexity and minimal usage of active or passive lumped components. The disclosed system comprises Gradient Refractive Index Meta-surface (GRIM) and the antenna disposed on the same side of a substrate. Beam steering control is performed using port excitations and controlling the phase between the concerned ports externally.

18 Claims, 11 Drawing Sheets

(51) Int. Cl.
*H01Q 3/26* (2006.01)
*H01Q 19/30* (2006.01)

(58) Field of Classification Search
CPC ...... H01Q 19/30; H01Q 21/08; H01Q 25/002; H01Q 25/007
See application file for complete search history.

(56) References Cited

OTHER PUBLICATIONS

Fan, Tingting et al., "A multibeam slot antenna using dual-layer metasurface", Title of the item: Electromagnetics, Date: Nov. 2021, pp. 393-408, vol. 41, No. 6, Publisher: Taylor & Francis Group, LLC, https://www.tandfonline.com/doi/pdf/10.1080/02726343.2021.2002545.
Abdulkarim, Yadgar I. et al., "A Low-Profile Antenna Based on Single-Layer Metasurface for Ku-Band Applications", Title of the item: International Journal of Antennas and Propagation, Date: Dec. 2020, vol. 2020, Publisher: Hindawi, https://www.researchgate.net/publication/348193337_A_Low-Profile_Antenna_Based_on_Single-Layer_Metasurface_for_Ku-Band_Applications.
Hongnara, Tanan et al., "Design of Compact Beam-Steering Antennas Using a Metasurface Formed by Uniform Square Rings", Title of the item: IEEE Access, Date: Jan. 30, 2018 pp. 9420-9429, Publisher: IEEE, https://ieeexplore.ieee.org/document/8272328.

* cited by examiner h= 9.9 mm w1= 4mm w2= 3 mm

| |
|---|
| gap=10.325 mm |
| p= 6.5 mm |
| q= 4.2 mm |
| r= 9.075mm |

MULTI-PORT MULTI-FUNCTIONAL META-SURFACE COPLANAR ANTENNA SYSTEM FOR BEAM STEERING CONTROL

PRIORITY CLAIM

This U.S. patent application claims priority under 35 U.S.C. § 119 to: Indian Patent Application No. 202221040497, filed on Jul. 14, 2022. The entire contents of the aforementioned application are incorporated herein by reference.

TECHNICAL FIELD

The disclosure herein generally relates to meta-surface antenna system, and, more particularly, to a multi-port multi-functional meta-surface coplanar antenna system for beam steering control.

BACKGROUND

With the advent of ubiquitous connectivity services and introduction of 5G in communication, antenna engineering design challenges have undergone a paradigm shift in terms of their robustness requirements and performance diversity applications. For high frequency wireless communication under 5G scenarios coming with the millimeter wave (mm-wave) systems, the primary hurdle is of path loss at higher frequencies, which limits the radiators' application to short-range usage. Therefore, for free license 5G bands such as the FR2 band of frequencies (ranging around 28 GHz), high-gain, highly directive antennas are suggested for practical installation. Along with the maintainability of such high-gain characteristics of the concerned radiators, deflecting and controlling beam patterns play a vital role in communication engineering for attributes such as quality of service, immunity against interference, system security and economic usage of system power.

Mechanical and/or electronic solutions are available as the most conventional ones, for introducing such beam steering functionalities for the concerned radiators, but they do come with some inherent costs for their installation. For such mechanical solutions, the performance speed will be less, and bulkier structures will be required to be fitted with the radiators in order to incorporate the mechanical steering facilities. Integration of active electronic components over the radiating structures to incorporate a beam-steering performance will come at the cost of the system's net radiation gain, which is affected by the presence of the electronic components inside the region of radiation. For electronic and/or phased array systems, although high switching speed can be achieved, for the latter case the transceiver architecture becomes more complex to design and deliver for general usage.

SUMMARY

Embodiments of the present disclosure present technological improvements as solutions to one or more of the above-mentioned technical problems recognized by the inventors in conventional systems.

In an aspect, there is provided a multi-port multi-functional meta-surface coplanar antenna system comprising: a set of coplanar antennas having a set of antenna ports positioned on a first side of a substrate and communicating with a Radio Frequency (RF) input to receive and transmit radio waves; a set of Gradient Refractive Index Metasurface (GRIM) disposed on the first side of the substrate at a pre-defined gap and at a pre-defined offset from the set of antennas along a direction of the radio waves, wherein the GRIM is configured to tilt the radio waves in a desired direction, wherein each GRIM comprises a set of metamaterial unit cells having a rectangular stub at center of each metamaterial unit cell; a switched time-delay network (STDN) unit connected to the set of coplanar antennas and configured for phase shifting the radio waves wherein the STDN unit having one or more radio frequency cables and two or more Single Pole Double Throw (SPDT) switches; and a controller unit in communication with the STDN unit wherein the controller unit comprises: one or more data storage devices configured to store instructions; one or more communication interfaces; and one or more hardware processors operatively coupled to the one or more data storage devices via the one or more communication interfaces, wherein the one or more hardware processors are configured to be operated by the instructions to: obtain a pre-defined excitation matrix such that the pre-defined excitation matrix programs phase gradient values of radio waves using the STDN unit for beam steering control by exciting one or more antenna ports amongst the set of antenna ports, wherein the beam steering control is one or more of (i) steering of beams of the radio waves (ii) obtaining a set of beam patterns of the radio waves and (iii) controlling beam-width of the radio waves.

In another aspect, there is provided a processor implemented method comprising the steps of: positioning a set of coplanar antennas having a set of antenna ports on a first side of a substrate and cooperating with a Radio Frequency (RF) input to receive and transmit radio waves; disposing a set of Gradient Refractive Index Meta-surface (GRIM) on the first side of the substrate at a pre-defined gap and at a pre-defined offset from the set of coplanar antennas along a direction of the radio waves and configuring to tilt the radio waves in a desired direction wherein each GRIM comprises a set of metamaterial unit cells having a rectangular stub at center of each metamaterial unit cell; connecting a switched time-delay network (STDN) unit to the set of coplanar antennas and configuring for phase shifting the radio waves wherein the STDN having one or more radio frequency cables and two or more Single Pole Double Throw (SPDT) switches; and obtaining a pre-defined excitation matrix by a controller unit, that the pre-defined excitation matrix programs phase gradient values of radio waves using the STDN unit for beam steering control by exciting one or more antenna ports wherein the beam steering control is one or more of (i) steering of beams of the radio waves (ii) obtaining a set of beam patterns of the radio waves and (iii) controlling beam-width of the radio waves.

In accordance with an embodiment of the present disclosure, the pre-defined gap and the pre-defined offset is optimized based on parametric simulations.

In accordance with an embodiment of the present disclosure, each GRIM is disposed on the first side of the substrate at the pre-defined gap and the pre-defined offset from at most two coplanar antennas amongst the set of antennas.

In accordance with an embodiment of the present disclosure, the set of coplanar antennas are periodically positioned at an equidistance from each other along the length of the substrate.

In accordance with an embodiment of the present disclosure, the phase shifting of radio waves is performed with a 180-degree phase difference being introduced between the one or more antenna ports using the STDN.

In accordance with an embodiment of the present disclosure, the set of beam patterns are one or more of (i) single (ii) dual or (iii) triple.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
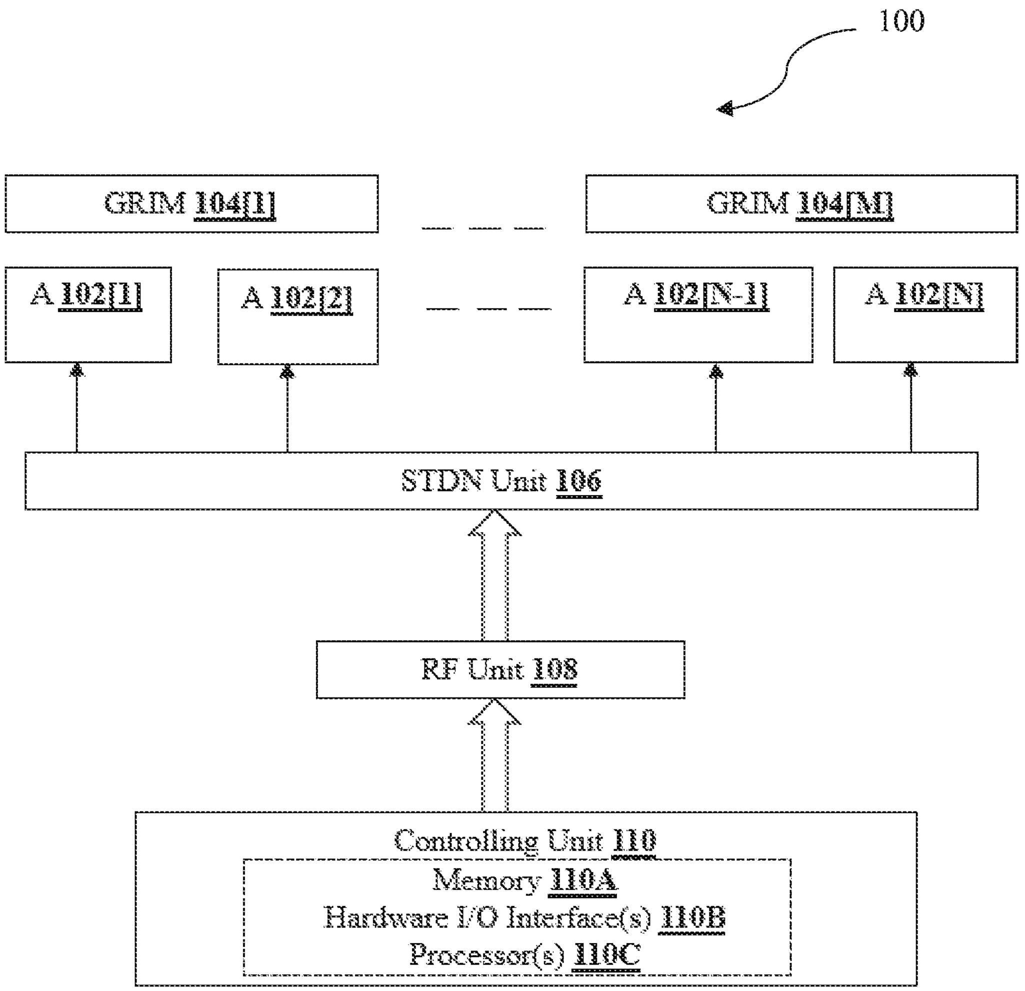
FIG. 1 illustrates an exemplary block diagram of multi-port multi-functional meta-surface coplanar antenna system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Integration of meta-structures or meta-surfaces with the primary radiators for beam-tilting applications is being seen as a viable low-cost alternative to complex mechanical or electronically controlled techniques. Metamaterials are periodically placed artificial structures having certain exquisite qualities which are not readily available in nature. However, these help us to effectively control wave propagation in a medium. Such meta-surfaces do also come with their limitations and for such cases often the meta-structures or surfaces are loaded with additional electronic components to further fine tune or control the beam-tilting performance, thus making the system complex and intricate once more like the available solutions. Also, in most cases the integrated meta-surfaces are presented as 3D complete structures with the geometrical shapes often extending beyond multiple layers of the substrate, making it even more difficult for fabrication.

The disclosed multi-port multi-functional meta-surface coplanar antenna system is built utilizing the design concept of two antennas loaded with a Gradient Refractive Index Meta-surface (GRIM) surface at the front end as a building block for an extended composite system. The antennas and the GRIM surface are placed on the same side of a substrate. They are periodically placed side by side to increase the number of ports and further enhance the functional diversity of the combined structure. The disclosed design has a zero presence of lumped electronic components which is conceived on a single side of the substrate with beam steering control to be obtained by simple switching of port excitations. To enhance the diversity of the said control, phase gradients are introduced in some cases between the selected ports. However, for all such cases a 180-degree phase difference has only been introduced to conceive beam diversity characteristics.

In the context of the subject disclosure, definitions of certain expressions and their usage are as explained herein below.

- Metamaterial is an artificial structure that are periodically or randomly distributed and exhibits extraordinary electromagnetic properties. Metamaterial helps to effectively control wave propagation in a medium.
- Meta-surface is a 2-Dimensional representation of the metamaterial with a thickness less than operating wavelength. Essentially, it consists of a periodic arrangement of "unit cells" (dimension of each unit cell<<a wavelength ($\lambda$) corresponding to a frequency of interest) printed on a Printed Circuit Board (PCB) material like Rogers RT-Duroid® 5880 (dielectric constant or relative permittivity=2.2) or say Flame Retardant material (FR-4) (dielectric constant or relative permittivity=4.4). Any substrate material may be chosen with a sole consideration that the substrate height is less than $\lambda$.
- The expressions 'PCB' and 'Printed Circuit Board' and 'substrate' may be interchangeably used.
- The expressions 'metamaterial unit cell' and 'unit cell' and 'metamaterial' may be interchangeably used.
- The expressions 'meta-surface' and 'Gradient Refractive Index Meta-surface (GRIM)' may be interchangeably used.
- The expressions 'antenna port' and 'port' may be interchangeably used.
- The expressions 'excitation matrix' and 'matrix' may be interchangeably used.

Referring now to the drawings, and more particularly to FIG. 1 through FIG. 11D, where similar reference characters denote corresponding features consistently throughout the figures, there are shown preferred embodiments and these embodiments are described in the context of the following exemplary system and/or method.

Figure 2:
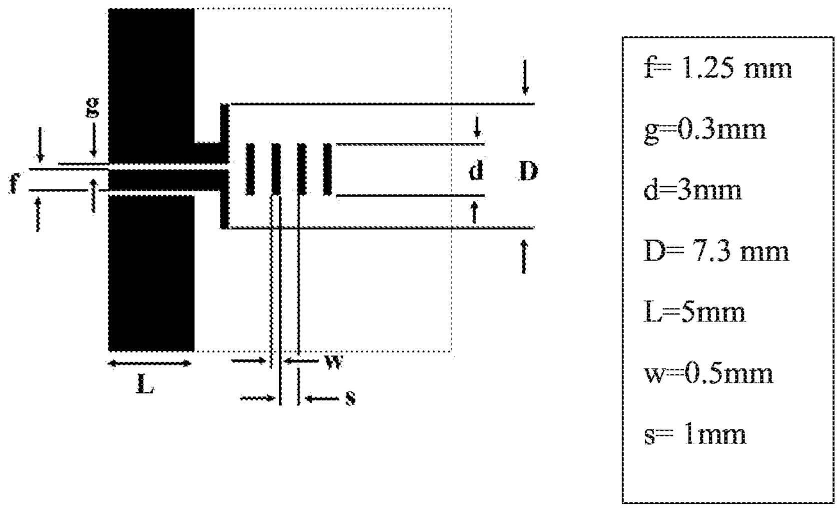
FIG. 2 illustrates an exemplary representation of a stand-alone CPW-fed Yagi-Uda Antenna configuration according to some embodiments of the present disclosure.

FIG. 1 illustrates an exemplary block diagram of multi-port multi-functional meta-surface coplanar antenna system 100 according to some embodiments of the present disclosure. In an embodiment, the multi-port multi-functional meta-surface coplanar antenna system 100 comprises a set of coplanar antennas (102[1 . . . N]) having a set of antenna ports positioned on a first side of a substrate and communicating with a Radio Frequency (RF) unit 108 to receive and transmit radio waves. The set of coplanar antennas are periodically positioned at an equidistance from each other along the length of the substrate. The antenna is designed as a Coplanar Wave Guide (CPW)-fed Yagi Uda antenna structure which inherently gives a directive beam pattern along the azimuth. CPW-fed Yagi-Uda radiator is chosen to act as the principle antenna element for the configuration, being uniplanar and for having a directional beam pattern suitable for practical usage. The dimensions of the proposed radiator along with the number of director strips in front of the dipole are optimized to have the best matching and antenna gain performance throughout the concerned band of frequencies. Communication signals are fed to the set of coplanar antennas via the RF unit. FIG. 2 illustrates an exemplary representation of a stand-alone CPW-fed Yagi-Uda Antenna configuration according to some embodiments of the present disclosure.

The multi-port multi-functional meta-surface coplanar antenna system 100 further comprises a set of Gradient Refractive Index Meta-surface (GRIM) (104[1] . . . [M]) disposed on the first side of the substrate at a pre-defined gap and at a pre-defined offset from the set of antennas along a direction of the radio wave. The GRIM is configured to tilt the radio waves in a desired direction, wherein each GRIM comprises a set of metamaterial unit cells having a rectangular stub at center of each metamaterial unit cell. Each GRIM is disposed on the first side of the substrate at the pre-defined gap and the pre-defined offset from at most two coplanar antennas amongst the set of antennas. The pre-defined gap and the pre-defined offset is optimized based on parametric simulations.

Figure 3A:
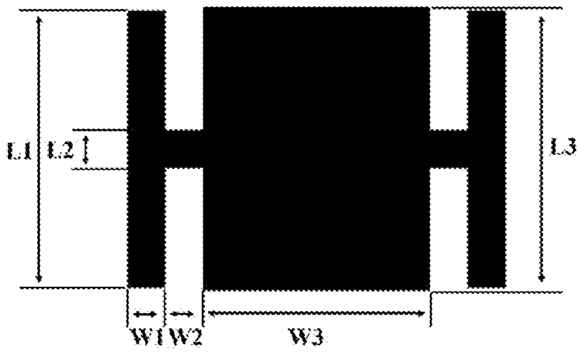
FIG. 3A and FIG. 3B illustrate an exemplary representation of metamaterial unit cell and Gradient Refractive Index Meta-surface (GRIM) respectively according to some embodiments of the present disclosure.
Figure 3B:
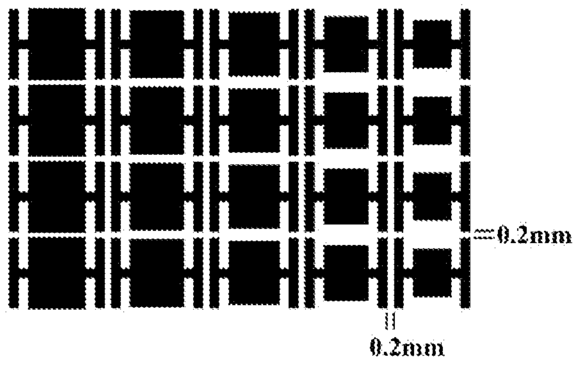

FIG. 3A and FIG. 3B illustrate an exemplary representation of the metamaterial unit cell and the GRIM respectively according to some embodiments of the present disclosure. The metamaterial unit cell is designed as per the physical dimensions obtained through optimization with the help of radio frequency (RF) simulation. The dimensions of the rectangular stub loaded at the centre of each unit cell, control the refractive index. As its dimensions are reduced, a gradual shift in the refractive indices is observed in accordance to the generalized Snell's law. This allows the GRIM to have a gradient nature in terms of its refractive index, which in turn influences the antenna radiation to be tilted in the concerned direction. Table 1 shows the dimensions of the designed meta-surface for the disclosed system. As shown in FIG. 3B, a 4×5 meta-surface is designed and used.

TABLE 1

| | | | | First Column | | Second Column | | Third Column | | Fourth Column | | Fifth Column | |
|---|---|---|---|---|---|---|---|---|---|---|---|---|---|
| L1 | W1 | L2 | W2 | L3 | W3 | L3 | W3 | L3 | W3 | L3 | W3 | L3 | W3 |
| 2.2 | 0.3 | 0.3 | 0.3 | 2.25 | 1.8 | 2.125 | 1.7 | 2 | 1.6 | 1.75 | 1.4 | 1.5 | 1.2 |

Figure 4:
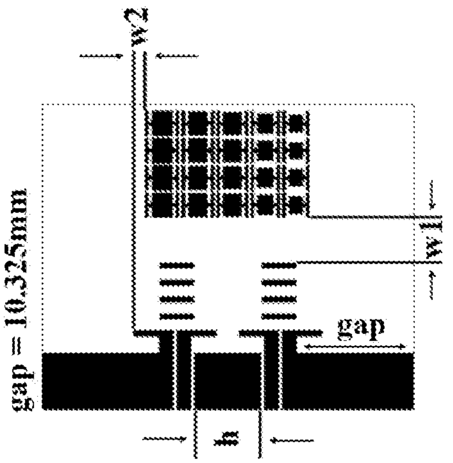
FIG. 4 illustrates an exemplary design of a 2-port integrated coplanar antenna and GRIM according to some embodiments of the present disclosure.
Figure 5:
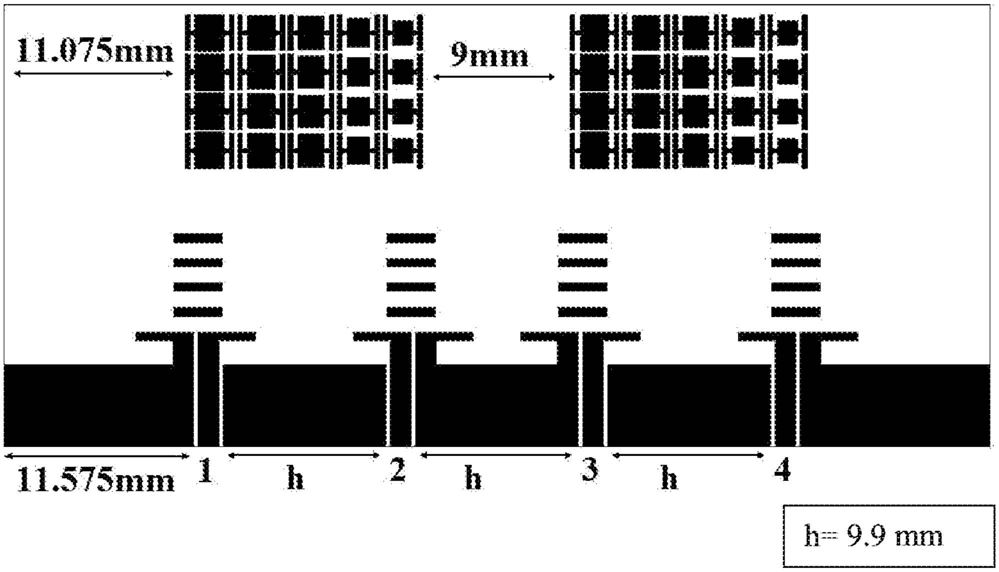
FIG. 5 illustrates an exemplary design of a 4-port integrated coplanar antenna and GRIM according to some embodiments of the present disclosure.
Figure 6:
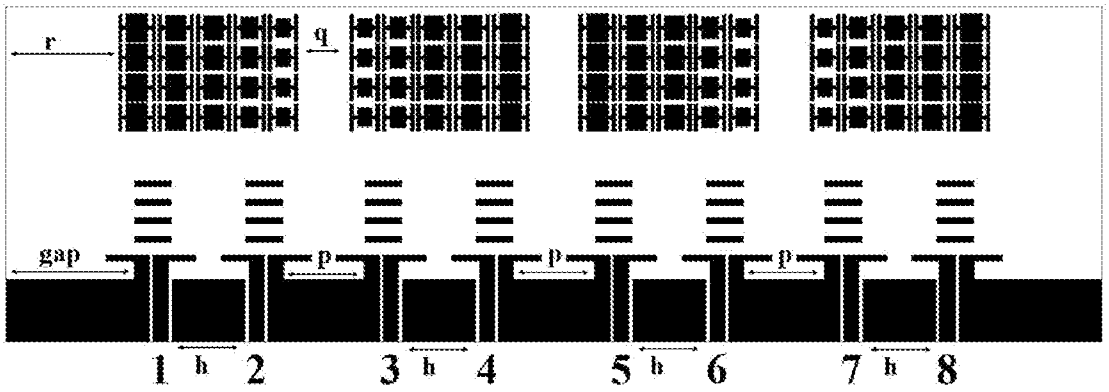
FIG. 6 illustrates an exemplary design of an 8-port integrated coplanar antenna and GRIM according to some embodiments of the present disclosure.

The antenna and the meta-surface are printed on RT Duroid 5880 substrate having a dielectric constant of 2.2 and a thickness of 0.7 mm. Different multi-port configurations are shown in FIG. 4, FIG. 5 and FIG. 6. The dimensions of these multi-port configurations are listed below in Table 2 and Table 3. FIG. 4 illustrates an exemplary design of a 2-port integrated coplanar antenna and GRIM according to some embodiments of the present disclosure. FIG. 5 illustrates an exemplary design of a 4-port integrated coplanar antenna and GRIM according to some embodiments of the present disclosure. Table 2 shows the dimensions of the designed 2-port and 4-port integrated coplanar antenna and GRIM structures.

TABLE 2

| D | d | f | g | L | w | s | w1 | w2 | h |
|---|---|---|---|---|---|---|---|---|---|
| 7.3 | 3 | 1.25 | 0.3 | 5 | 0.5 | 1 | 4 | 3 | 9.9 |

FIG. 6 illustrates an exemplary design of an 8-port integrated coplanar antenna and GRIM according to some embodiments of the present disclosure. Table 3 shows the dimensions of the designed 8-port integrated coplanar antenna and GRIM structures.

TABLE 3

| D | d | f | g | L | w | s | w1 | w2 | h | p | q | r | gap |
|---|---|---|---|---|---|---|---|---|---|---|---|---|---|
| 7.3 | 3 | 1.25 | 0.3 | 5 | 0.5 | 1 | 4 | 3 | 5.9 | 6.5 | 4.2 | 9.075 | 10.325 |

The multi-port multi-functional meta-surface coplanar antenna system is explained further henceforth with respect to the 2-port, 4-port and 8-port integrated coplanar antenna and GRIM structures. However, the concept of utilizing two antennas loaded with a GRIM surface at the front and the entire combination being on the same side of the substrate, that can be periodically placed side by side has an advantage to increase the number of ports further greater than 8 and enhance the functional diversity of the structure.

The multi-port multi-functional meta-surface coplanar antenna system 100 further comprises a switched time-delay network (STDN) unit 106 connected to the set of coplanar antennas and configured for phase shifting the radio waves. The STDN comprises one or more radio frequency cables and two or more Single Pole Double Throw (SPDT) switches. The phase shifting of radio waves is performed with a 180-degree phase difference being introduced between the one or more antenna ports using the STDN.

The multi-port multi-functional meta-surface coplanar antenna system 100 further comprises a controller unit 110 in communication with the STDN unit 106 wherein the controller unit comprises one or more data storage devices or memory 110A configured to store instructions; one or more communication interfaces 110B; and one or more hardware processors 110C operatively coupled to the one or more data storage devices via the one or more communication interfaces 110B, wherein the one or more hardware processors 110C are configured by the instructions to perform beam steering control.

The one or more hardware processors 110C can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the one or more hardware processors 110C can be implemented in a variety of computing systems, such as laptop computers, notebooks, hand-held devices, workstations, mainframe computers, servers, a network cloud and the like.

In an embodiment, the communication interface(s) or input/output (I/O) interface(s) 110B may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The one or more data storage devices or memory 110A may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the one or more hardware processors 110C are configured to obtain a pre-defined excitation matrix such that the pre-defined excitation matrix programs phase gradient values of radio waves using the STDN unit 106 for beam steering control by exciting one or more antenna ports amongst the set of antenna ports. The beam steering control is one or more of (i) steering of beams of the radio waves (ii) obtaining a set of beam patterns of the radio waves and (iii) controlling beam-width of the radio waves. The set of beam patterns are one or more of (i) single (ii) dual or (iii) triple. The achieved beam controlling mechanism is not merely on beam tilting but also over the number of beams obtained, the beam-width of individual radiation patterns and their tilting angles.

Since commercial phase shifters are essentially narrowband in nature, the STDNs are utilized as a combination of two RF cables of different length, and two Single Pole Double Throw (SPDT) switches. The difference between the lengths of the cables is $\lambda/2$, $\lambda$ corresponding to the central frequency of the operating band (between 26 GHz to 29 GHz).

CPW-fed Yagi-Uda antenna configurations, with GRIM surfaces ahead of them facilitate beam-tilting operation. This is performed by switching the signal excitations at the ports or by incorporating phase gradients between the selective port combinations. A wide range of beam patterns are generated and controlled in a real-time and granular manner. The concept of excitation matrix helps to choose the port combinations and the phase gradient introduced between them (if required) in a mathematical manner. For example, for an 8-port integrated coplanar antenna and GRIM shown in FIG. 6 an 8×8 matrix is considered where the element $a_{i,j}$ describe the choosing the $i^{th}$ port and the $j^{th}$ port respectively. The element in the matrix itself will contain the value of the phase gradient to be introduced between them.

In an embodiment, the excitation matrix for the 2-port integrated coplanar antenna and GRIM is defined as, $$\begin{pmatrix} a_{11} & a_{12} \\ a_{21} & a_{22} \end{pmatrix}; a_{11} = a_{22} = 1 \text{ or } 0, \text{ depending on excitation}; a_{12} = a_{21} = \beta \quad (1)$$

where $a_{ii}$ implies excitation of the $i^{th}$ port only, the phase gradient is undefined. The element $a_{i,j}$ describes the excitation of the $i^{th}$ port and the $j^{th}$ port respectively containing the value of the phase gradient $\beta$ to be introduced between them. Table 4 shows the non-trivial radiation patterns related to the excitation matrix.

TABLE 4

| Value of the Excitation Coefficient | Beam Nature | Beam Tilt | Beam Width | Gain (dB) |
|---|---|---|---|---|
| $a_{11} = 1$ | Tilted Single | −15 | 40 | 9.12 |
| $a_{22} = 1$ | Tilted Single | +15 | 40 | 9.58 |
| $a_{12} = a_{21}$ = beta = 0 | Tilted Dual | +15, −15 | 15, 15 | 10.02, 9.73 |
| $a_{12} = a_{21}$ = beta = 180 | Single Boresight | 0 | 20 | 10.74 |
| $a_{12} = a_{21}$ = beta = 120 | Boresight Steered | +5 | 20 | 10.93 |
| $a_{12} = a_{21}$ = beta = 220 | Boresight Steered | −5 | 20 | 10.63 |
| $a_{12} = a_{21}$ = beta = 260 | Boresight Steered | −10 | 20 | 10.4 |

Similarly, in an embodiment, the excitation matrix for the 4-port integrated coplanar antenna and GRIM is defined as, $$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}; a_{ii} = 1 \text{ or } 0,$$

$$\text{depending on excitation}; a_{ij} = a_{ji} = \beta = 0 \text{ or } 180 \quad (2)$$

where, $a_{ii}$ implies excitation of the $i^{th}$ port only, concept of phase gradient is undefined. The element $a_{i,j}$ describes the excitation of the $i^{th}$ port and the $j^{th}$ port respectively containing the value of the phase gradient $\beta$ to be introduced between them. Table 5 shows the non-trivial radiation patterns related to the excitation matrix.

TABLE 5

| Value of the Excitation Coefficient | Beam Nature | Beam Tilt | Beam Width | Gain (dB) |
|---|---|---|---|---|
| $a_{11} = a_{33} = 1$ | Tilted Single | −15 | 40 | 8.8 |
| $a_{22} = a_{44} = 1$ | Tilted Single | 15 | 40 | 8.7 |
| $a_{12} = 0$ or $a_{34} = 180$ | Tilted Dual | +15, −15 | 15, 15 | 9.1, 8.8 |
| $a_{12} = 180$ or $a_{34} = 0$ | Single Boresight | 0 | 10 | 10.6 |
| $a_{13} = 0$ | Triple Beam | +10 | 10 | 7.7 |
| | | −15 | 10 | 11.3 |
| | | −40 | 10 | 7.8 |
| $a_{24} = 180$ | Triple Beam | +40 | 10 | 6.4 |
| | | +15 | 10 | 11.2 |
| | | −10 | 10 | 7.3 |
| $a_{13} = 180$ | Dual Beam | 0 | 10 | 10.5 |
| | | −25 | 10 | 10.4 |
| $a_{24} = 0$ | Dual Beam | +25 | 10 | 10.6 |
| | | 0 | 10 | 10.8 |
| $a_{23} = 0$ | Single Boresight | 0 | 30 | 10.6 |
| $a_{23} = 180$ | Dual Beam | +25 | 20 | 6.6 |
| | | −20 | 20 | 6.3 |

In a similar manner, the excitation matrix for the 8-port integrated coplanar antenna and GRIM is defined.

Figure 7:
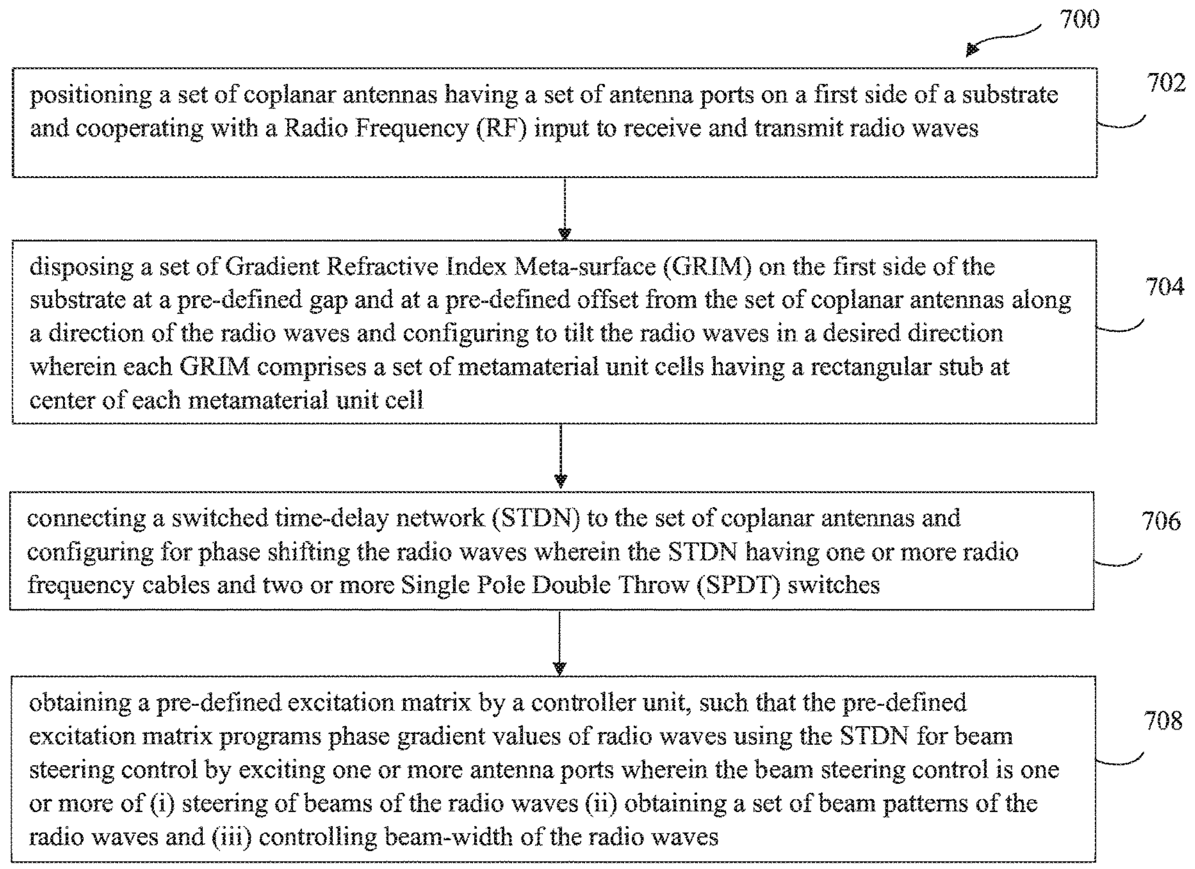
FIG. 7 is an exemplary flow diagram illustrating a computer implemented method for beam steering control of a multi-port multi-functional meta-surface coplanar antenna system according to some embodiments of the present disclosure.
Figure 8A:
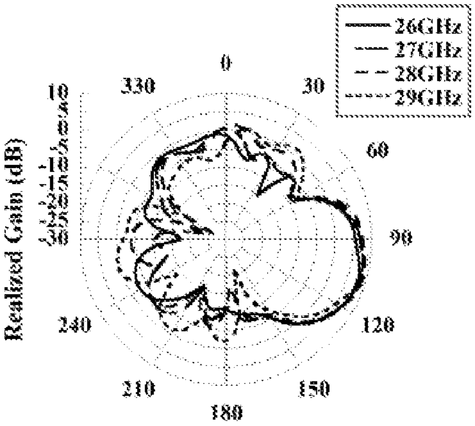
FIGS. 8A through 8D illustrates a graphical representation of radiation patterns corresponding to Table. 6 for 2-port integrated coplanar antenna and GRIM according to some embodiments of the present disclosure.
Figure 8B:
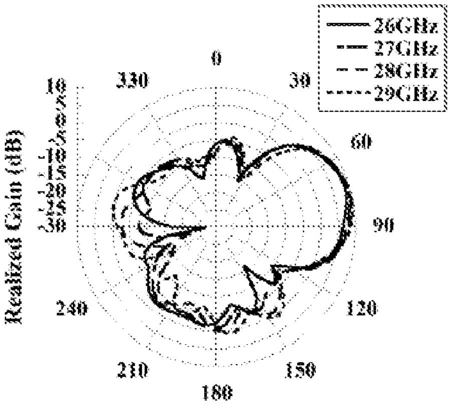
Figure 8C:
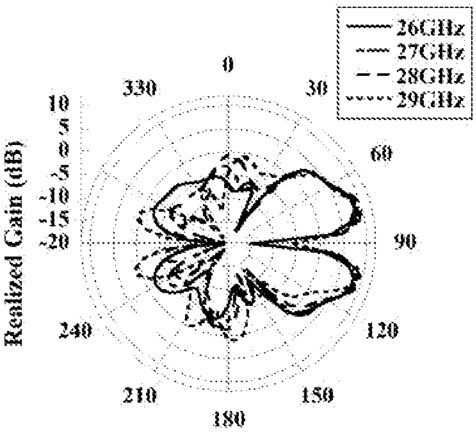
Figure 8D:
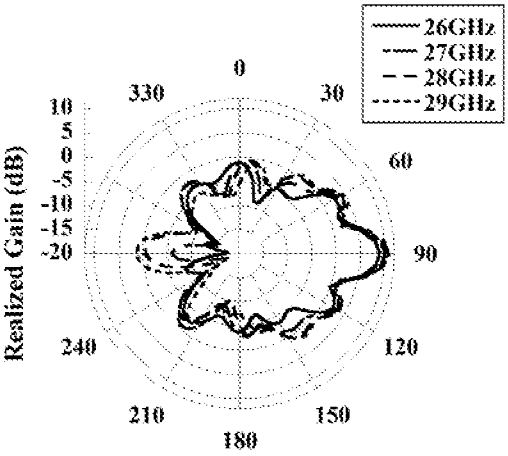

FIG. 7 is an exemplary flow diagram illustrating a computer implemented method 700 for beam steering control of a multi-port multi-functional meta-surface coplanar antenna system according to some embodiments of the present disclosure. The steps of the method 700 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the method 700 comprises, positioning, at step 702, a set of coplanar antennas (102[1 . . . N]) having a set of antenna ports on a first side of a substrate and cooperating with a Radio Frequency (RF) unit 108 to receive and transmit radio waves. A set of Gradient Refractive Index Meta-surface (GRIM) (104[1] . . . [M]) is disposed at step 704 on the first side of the substrate at a pre-defined gap and at a pre-defined offset from the set of coplanar antennas along a direction of the radio waves and configuring to tilt the radio waves in a desired direction wherein each GRIM comprises a set of metamaterial unit cells having a rectangular stub at center of each metamaterial unit cell. At step 706, a switched time-delay network (STDN) unit 106 is connected to the set of coplanar antennas and configuring for phase shifting the radio waves wherein the STDN unit having one or more radio frequency cables and two or more Single Pole Double Throw (SPDT) switches. Further at step 708, a pre-defined excitation matrix is obtained by a controller unit, such that the pre-defined excitation matrix programs phase gradient values of radio waves using the STDN for beam steering control by exciting one or more antenna ports wherein the beam steering control is one or more of (i) steering of beams of the radio waves (ii) obtaining a set of beam patterns of the radio waves and (iii) controlling beam-width of the radio waves.

EXPERIMENTAL EVALUATION: Dynamic beam tilting performance with respect to port excitation(s) for 2-port integrated coplanar antenna and GRIM is provided in Table 6 below.

TABLE 6

| SI. No. | Excited Port(s) | Beam Tilt Angle (Degree) | 3-dB Beamwidth (Degree) | Maximum Gain (dB) |
|---|---|---|---|---|
| 1. | 1 | −15 | 40 | 9.12 |
| 2. | 2 | +15 | 40 | 9.58 |
| 3. | 1, 2 (Zero Phase) | +15 | 15 | 10.02 |
| | (Dual Beam) | −15 | 15 | 9.73 |
| 4. | 1, 2 (180 Phase) | 0 | 20 | 10.74 |

FIGS. 8A through 8D illustrates a graphical representation of radiation patterns corresponding to Table. 6 for 2-port integrated coplanar antenna and GRIM according to some embodiments of the present disclosure. From the Table 6 values it is analysed that by merely controlling the excitation of the ports and introducing a digital phase controlling mechanism between them (which requires no loaded components on the radiator itself) a higher degree of beam control can be achieved.

Similarly, dynamic beam tilting performance with respect to port excitation(s) for 4-port integrated coplanar antenna and GRIM and 8-port integrated coplanar antenna and GRIM is given in Table 7 and Table 8 respectively below.

TABLE 7

| SI. No. | Excited Port(s) | Beam Tilt Angle (Degree) | 3-dB Beamwidth (Degree) | Maximum Gain (dB) |
|---|---|---|---|---|
| 1. | 1 | −15 | 40 | 8.9 |
| 2. | 2 | +15 | 40 | 8.7 |
| 3. | 3 | −15 | 40 | 8.7 |
| 4. | 4 | +15 | 40 | 8.6 |
| 5. | 1, 2 (Zero Phase) | +15 | 15 | 9.07 |
| | (Dual Beam) | −15 | 15 | 9.09 |
| 6. | 1, 2 (180 Phase) | 0 | 10 | 10.5 |
| 7. | 3, 4 (Zero Phase) | 0 | 10 | 10.8 |
| 8. | 3, 4 (180 Phase) | +15 | 15 | 9.3 |
| | (Dual Beam) | −15 | 15 | 8.5 |
| 9. | 1, 3 (Zero Phase) | +10 | 10 | 7.7 |
| | (Triple Beam) | −15 | 10 | 11.3 |
| | | −40 | 10 | 7.8 |
| 10. | 1, 3 (180 Phase) | 0 | 10 | 10.5 |
| | (Dual Beam) | −25 | 10 | 10.4 |
| 11. | 2, 4 (Zero Phase) | +25 | 10 | 10.6 |
| | (Dual Beam) | 0 | 10 | 10.8 |
| 12. | 2, 4 (180 Phase) | +40 | 10 | 6.4 |
| | (Triple Beam) | +15 | 10 | 11.2 |
| | | −10 | 10 | 7.3 |
| 13. | 2, 3 (Zero Phase) | 0 | 30 | 10.6 |
| 14. | 2, 3 (180 Phase) | +25 | 20 | 6.6 |
| | (Dual Beam) | −20 | 20 | 6.3 |

TABLE 8

| SI. No. | Excited Port(s) | Beam Tilt Angle (Degree) | 3-dB Beamwidth (Degree) | Maximum Gain (dB) |
|---|---|---|---|---|
| 1. | 1 | −15 | 40 | 7.3 |
| 2. | 2 | +15 | 40 | 7.01 |
| 3. | 3 | −15 | 40 | 7.2 |
| 4. | 4 | +10 | 40 | 6.7 |
| 5. | 5 | −15 | 40 | 7 |
| 6. | 6 | +15 | 35 | 7.5 |
| 7. | 7 | −10 | 40 | 6.3 |
| 8. | 8 | +10 | 30 | 7.2 |
| 9. | 1, 2 | 0 | 25 | 8.2 |
| 10. | 3, 4 | 0 | 30 | 7.7 |
| 11. | 5, 6 | 0 | 25 | 7.7 |
| 12. | 7, 8 (Dual Beam) | +15 | 15 | 6.2 |
| | | −30 | 25 | 6 |

TABLE 8-continued

| SI. No. | Excited Port(s) | Beam Tilt Angle (Degree) | 3-dB Beamwidth (Degree) | Maximum Gain (dB) |
|---|---|---|---|---|
| 13. | 1, 3 (Dual Beam) | 0 | 15 | 8.1 |
| | | −15 | 15 | 6 |
| 14. | 2, 4 (Dual Beam) | +35 | 10 | 4.5 |
| | | 0 | 20 | 7.7 |
| 15. | 5, 7 | 0 | 10 | 7.9 |
| 16. | 6, 8 | +15 | 10 | 9.9 |
| 17. | 2, 3 | 0 | 40 | 8.3 |
| 18. | 4, 5 (Dual Beam) | +25 | 20 | 4 |
| | | −25 | 20 | 4.3 |
| 19. | 6, 7 | 0 | 40 | 8.7 |
| 20. | 1, 2, 3, 4 | 0 | 20 | 10.8 |
| 21. | 5, 6, 7, 8 | +10 | 10 | 9.1 |
| | (Dual Split Beam) | −5 | 10 | 7.1 |
| 22. | 1, 3, 5, 7 | +5 | 5 | 7.5 |
| | (Dual Split Beam) | −5 | 5 | 8.9 |
| 23. | 2, 4, 6, 8 | +10 | 15 | 9.2 |
| 24. | All Ports | +10 | 5 | 10 |
| | (Dual Split Beam) | −10 | 5 | 9.3 |
| 25. | All Ports (With a 180 degree phase shift between the groups 1, 2, 3, 4 and 5, 6, 7, 8 | 0 | 10 | 11.5 |

When all the eight ports of the 8-port integrated coplanar antenna and GRIM are excited but with a 180-degree phase difference between the ports 1, 2, 3, 4 and 5, 6, 7, 8 respectively, a highly directive beam with a gain value of 11.5 dB and with a sharp 3 dB beamwidth of 10 degree was obtained. A comparison amongst the operational attributes achieved through the 8-port integrated coplanar antenna and GRIM is shown in Table 9 below.

TABLE 9

| SI. No. | Name of the Attribute | Achievement through this Configuration |
|---|---|---|
| 1. | Max Beam tilt in the Positive Direction | 35 degree |
| 2. | Max Beam tilt in the Negative Direction | 30 degree |
| 3. | Min Beam tilt in the Positive Direction | 5 degree |
| 4. | Min Beam tilt in the Positive Direction | 5 degree |
| 5. | Max Gain for a straight beam without any tilt | 10.8 dB |
| 6. | Min Gain for a straight beam without any tilt | 7.7 dB |
| 7. | Max Gain for a tilted beam | 9.9 dB |
| 8. | Min Gain for a tilted beam | 6.3 dB |
| 9. | Max Gains for a dual beam output | 10 dB, 9.3 dB |
| 10. | Min Gains for a dual beam output | 4 dB, 4.3 dB |
| 11. | Max Beamwidth for a straight beam without any tilt | 40 degree |
| 12. | Min Beamwidth for a straight beam without any tilt | 10 degree |
| 13. | Max Beamwidth for a tilted beam | 40 degree |
| 14. | Min Beamwidth for a tilted beam | 10 degree |
| 15. | Max Beamwidths for dual beam output | 20 degree, 20 degree |
| 16. | Min Beamwidths for dual beam output | 5 degree, 5 degree |
| *17. | Max Gain for a straight beam without any tilt (with one (1) additional phase-shifter) | 11.5 dB (with a 10 degree 3 dB Beamwidth) |

Where * is a particular case where performance has been observed by exciting all the eight ports of the structure but with a 180-degree phase difference between the ports 1, 2, 3, 4 and 5, 6, 7, 8 respectively.

Figure 9A:
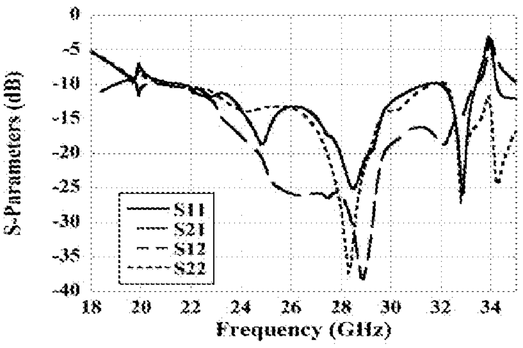
FIG. 9A and FIG. 9B illustrates a graphical representation of S-parameter results for 2-port and 4-port coplanar antenna and GRIM respectively according to some embodiments of the present disclosure.
Figure 9B:
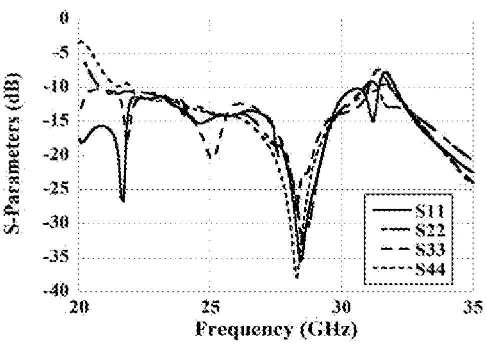
Figure 10A:
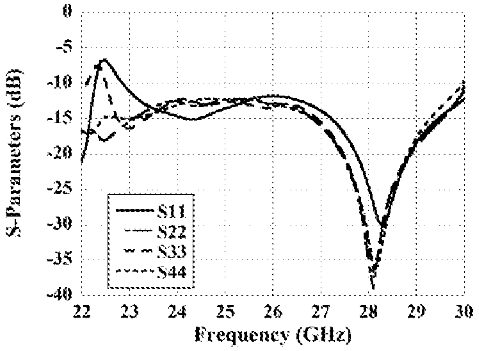
FIG. 10A and FIG. 10B illustrates a graphical representation of S-parameter results for 8-port integrated coplanar antenna and GRIM according to some embodiments of the present disclosure.
Figure 10B:
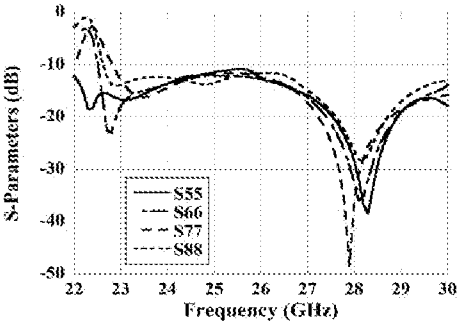
Figure 11A:
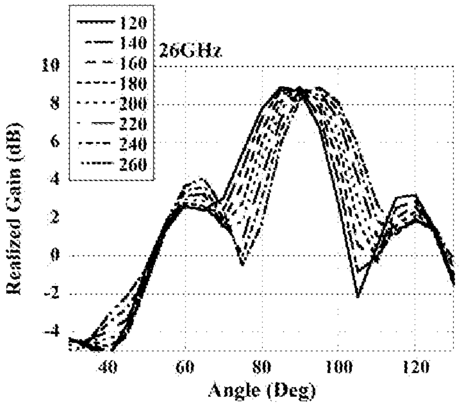
FIG. 11A through FIG. 11D illustrates a graphical representation of swinging beam between 80-degree to 100-degree in the azimuth for 2-port coplanar antenna and GRIM during port excitation according to some embodiments of the present disclosure.
Figure 11B:
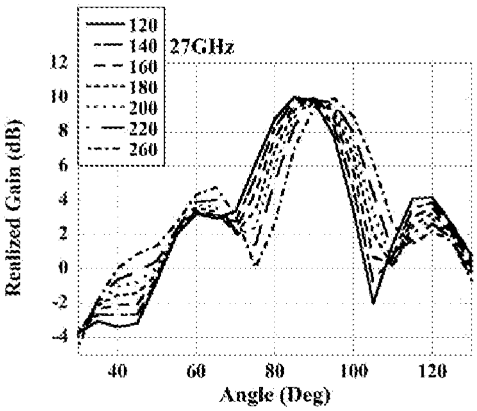
Figure 11C:
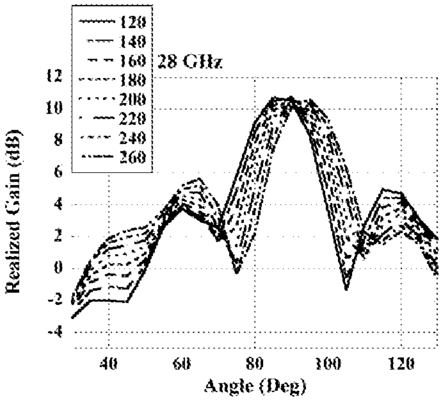
Figure 11D:
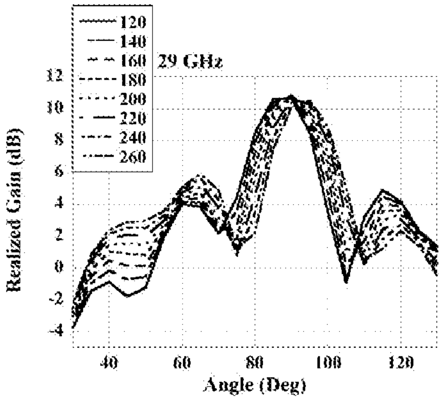

The input reflection characteristics for the 2-port, 4-port and 8-port coplanar antenna and GRIM are shown in FIG. 9A, FIG. 9B, FIG. 10A and FIG. 10B. The figures depict the antenna $|S_{ii}|$ parameters for all the ports labelled i=1 to 2/4/8, and it shows stable input reflection performance lying well below −10 dB throughout the FR2 band of frequencies between 26 GHz to 29 GHz. FIG. 9A and FIG. 9B illustrates S-parameter results for 2-port and 4-port coplanar antenna and GRIM respectively according to some embodiments of the present disclosure. FIG. 10A and FIG. 10B illustrates S-parameter results for 8-port integrated coplanar antenna and GRIM according to some embodiments of the present disclosure.

FIG. 11A through FIG. 11D illustrates swinging beam between 80-degree to 100-degree in the azimuth for 2-port coplanar antenna and GRIM during port excitation according to some embodiments of the present disclosure. The figures show swinging the beam between 80-degree to 100-degree in the azimuth for 2-port coplanar antenna and GRIM when both the ports are excited and a software-controlled phase difference (in degrees, as per the legends) is introduced between them, for different frequencies. For all the frequencies the beam steering capabilities with perfectly stable gain characteristics are recorded while exciting the ports and maintaining a phase gradient between them.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A multi-port multi-functional meta-surface coplanar antenna system comprising:

a set of coplanar antennas having a set of antenna ports positioned on a first side of a substrate and communicating with a Radio Frequency (RF) input to receive and transmit radio waves;

a set of Gradient Refractive Index Meta-surface (GRIM) disposed on the first side of the substrate at a pre-defined gap and at a pre-defined offset from the set of antennas along a direction of the radio waves, wherein the GRIM is configured to tilt the radio waves in a desired direction, wherein each GRIM comprises a set of metamaterial unit cells having a rectangular stub at center of each metamaterial unit cell;

a switched time-delay network (STDN) unit connected to the set of coplanar antennas and configured for phase shifting the radio waves wherein the STDN unit having one or more radio frequency cables and two or more Single Pole Double Throw (SPDT) switches; and a controller unit in communication with the STDN unit wherein the controller unit comprises:

one or more data storage devices configured to store instructions;

one or more communication interfaces (and one or more hardware processors operatively coupled to the one or more data storage devices via the one or more communication interfaces, wherein the one or more hardware processors are configured to be operated by the instructions to:

obtain a pre-defined excitation matrix such that the pre-defined excitation matrix programs phase gradient values of radio waves using the STDN unit for beam steering control by exciting one or more antenna ports amongst the set of antenna ports, wherein the beam steering control is one or more of (i) steering of beams of the radio waves (ii) obtaining a set of beam patterns of the radio waves and (iii) controlling beam-width of the radio waves, wherein the excitation matrix is for 2-port, 4-port and 8-port integrated coplanar antenna, wherein in the 2-port integrated coplanar antenna, a phase gradient value ranges from 0 to 260, in the 4-port integrated coplanar antenna, the phase gradient value is 0 or 180.

2. The multi-port multi-functional meta-surface coplanar antenna system of claim 1, wherein the pre-defined gap and the pre-defined offset is optimized based on parametric simulations.

3. The multi-port multi-functional meta-surface coplanar antenna system of claim 1, wherein each GRIM is disposed on the first side of the substrate at the pre-defined gap and the pre-defined offset from at most two coplanar antennas amongst the set of antennas.

4. The multi-port multi-functional meta-surface coplanar antenna system of claim 1, wherein the set of coplanar antennas are periodically positioned at an equidistance from each other along the length of the substrate.

5. The multi-port multi-functional meta-surface coplanar antenna system of claim 1, wherein the phase shifting of radio waves is performed with a 180-degree phase difference being introduced between the one or more antenna ports using the STDN, wherein 180-degree phase difference being introduced only to conceive beam diversity characteristics.

6. The multi-port multi-functional meta-surface coplanar antenna system of claim 1, wherein the set of beam patterns are one or more of (i) single (ii) dual or (iii) triple.

7. A processor implemented method comprising the steps of:

positioning a set of coplanar antennas having a set of antenna ports on a first side of a substrate and cooperating with a Radio Frequency (RF) input to receive and transmit radio waves;

disposing a set of Gradient Refractive Index Meta-surface (GRIM) on the first side of the substrate at a pre-defined gap and at a pre-defined offset from the set of coplanar antennas along a direction of the radio waves and configuring to tilt the radio waves in a desired direction wherein each GRIM comprises a set of metamaterial unit cells having a rectangular stub at center of each metamaterial unit cell;

connecting a switched time-delay network (STDN) unit to the set of coplanar antennas and configuring for phase shifting the radio waves wherein the STDN having one or more radio frequency cables and two or more Single Pole Double Throw (SPDT) switches; and obtaining a pre-defined excitation matrix by a controller unit, that the pre-defined excitation matrix programs phase gradient values of radio waves using the STDN unit for beam steering control by exciting one or more antenna ports wherein the beam steering control is one or more of (i) steering of beams of the radio waves (ii) obtaining a set of beam patterns of the radio waves and (iii) controlling beam-width of the radio waves, wherein the excitation matrix is for 2-port, 4-port and 8-port integrated coplanar antenna, wherein in the 2-port integrated coplanar antenna, a phase gradient value ranges from 0 to 260, in the 4-port integrated coplanar antenna, the phase gradient value is 0 or 180.

8. The processor implemented method of claim 7, wherein the pre-defined gap and the pre-defined offset is optimized based on parametric simulations.

9. The processor implemented method of claim 7, wherein each GRIM is disposed on the first side of the substrate at the pre-defined gap and the pre-defined offset from at most two coplanar antennas amongst the set of antennas.

10. The processor implemented method of claim 7, wherein the set of coplanar antennas are periodically positioned at an equidistance from each other along the length of the substrate.

11. The processor implemented method of claim 7, wherein the phase shifting of radio waves is performed with a 180-degree phase difference being introduced between the one or more antenna ports using the STDN, wherein 180-degree phase difference being introduced only to conceive a beam diversity characteristics.

12. The processor implemented method of claim 7, wherein the set of beam patterns are one or more of (i) single (ii) dual or (iii) triple.

13. One or more non-transitory machine-readable information storage mediums comprising one or more instructions which when executed by one or more hardware processors cause:

positioning a set of coplanar antennas having a set of antenna ports on a first side of a substrate and cooperating with a Radio Frequency (RF) input to receive and transmit radio waves;

disposing a set of Gradient Refractive Index Meta-surface (GRIM) on the first side of the substrate at a pre-defined gap and at a pre-defined offset from the set of coplanar antennas along a direction of the radio waves and configuring to tilt the radio waves in a desired direction wherein each GRIM comprises a set of metamaterial unit cells having a rectangular stub at center of each metamaterial unit cell;

connecting a switched time-delay network (STDN) unit to the set of coplanar antennas and configuring for phase shifting the radio waves wherein the STDN having one or more radio frequency cables and two or more Single Pole Double Throw (SPDT) switches; and obtaining a pre-defined excitation matrix by a controller unit, that the pre-defined excitation matrix programs phase gradient values of radio waves using the STDN unit for beam steering control by exciting one or more antenna ports wherein the beam steering control is one or more of (i) steering of beams of the radio waves (ii) obtaining a set of beam patterns of the radio waves and (iii) controlling beam-width of the radio waves, wherein the excitation matrix is for 2-port, 4-port and 8-port integrated coplanar antenna, wherein in the 2-port integrated coplanar antenna, a phase gradient value ranges from 0 to 260, in the 4-port integrated coplanar antenna, the phase gradient value is 0 or 180.

14. The one or more non-transitory machine-readable information storage mediums of claim 13, wherein the pre-defined gap and the pre-defined offset is optimized based on parametric simulations.

15. The one or more non-transitory machine-readable information storage mediums of claim 13, wherein each GRIM is disposed on the first side of the substrate at the pre-defined gap and the pre-defined offset from at most two coplanar antennas amongst the set of antennas.

16. The one or more non-transitory machine-readable information storage mediums of claim 13, wherein the set of coplanar antennas are periodically positioned at an equidistance from each other along the length of the substrate.

17. The one or more non-transitory machine-readable information storage mediums of claim 13, wherein the phase shifting of radio waves is performed with a 180-degree phase difference being introduced between the one or more antenna ports using the STDN, wherein 180-degree phase difference being introduced only to conceive a beam diversity characteristics.

18. The one or more non-transitory machine-readable information storage mediums of claim 13, wherein the set of beam patterns are one or more of (i) single (ii) dual or (iii) triple.

* * * * *